July 16, 1929.  L. S. PFOUTS  1,721,469

CONTROL MECHANISM FOR FILLING AND EMPTYING RECEPTACLES

Original Filed Oct. 20, 1920  3 Sheets-Sheet 1

INVENTOR:
Leroy S. Pfouts
BY
Geo. A. Pitts
ATTORNEY

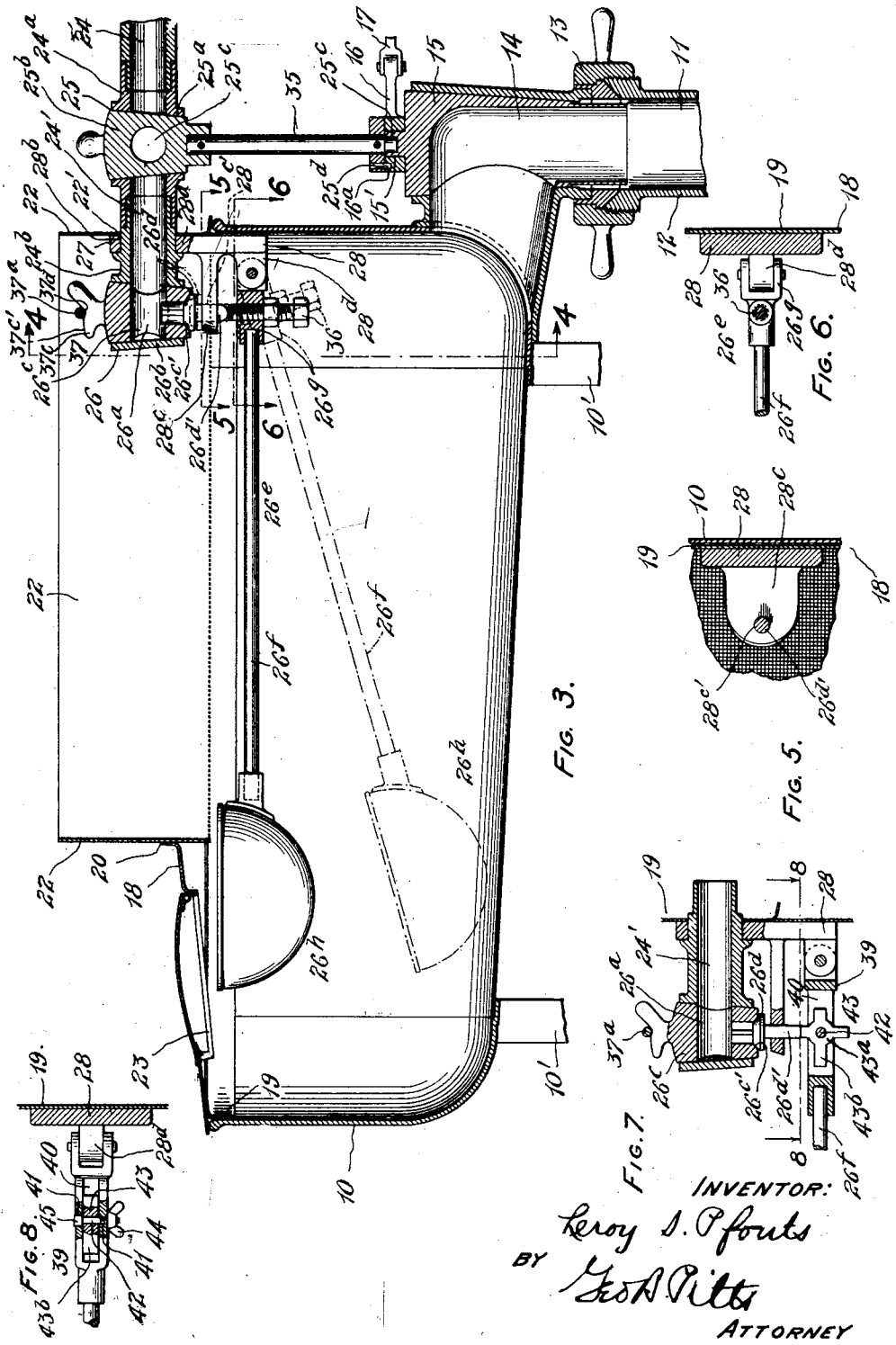

Patented July 16, 1929.

1,721,469

UNITED STATES PATENT OFFICE.

LEROY S. PFOUTS, OF CANTON, OHIO, ASSIGNOR TO THE H. H. MILLER INDUSTRIES COMPANY, OF CANTON, OHIO, A CORPORATION OF OHIO.

CONTROL MECHANISM FOR FILLING AND EMPTYING RECEPTACLES.

Application filed October 20, 1920, Serial No. 418,158. Renewed September 12, 1928.

This invention relates to mechanism for controlling the successive filling and empty of a series of receptacles. The invention is shown as applied to an ice cream making machine of the type having associated with it a batch tank.

One object of the invention is to provide, in an apparatus comprising a plurality of connected receptacles having valve mechanisms for controlling said connections and the supply pipe to one of said receptacles, mechanism which automatically cuts off the supply of the material when the adjacent tank or receptacle is filled.

Another object of the invention is to provide, in apparatus comprising a plurality of receptacles having liquid connections between them, a valve mechanism for the supply pipe leading to the first receptacle of the series and to so correlate it with the valve mechanism which controls the conduit or liquid connection from that receptacle to the next receptacle in the series that the valve thereof is closed during emptying of the adjacent receptacle and is opened when the valve mechanism in the liquid connection leading therefrom is closed.

Another object of the invention is to provide an improved mechanism for controlling the filling and emptying of a batch tank and filling of a freezing cylinder, of an ice cream making machine, whereby the labor and time required for freezing successive batches of material are materially decreased.

Other objects of the invention will be apparent to those skilled in the art to which my invention relates from the following description taken in connection with the accompanying drawings.

For the purpose of illustration, I have herein shown and described one form of apparatus embodying my invention.

Referring to the drawings,

Fig. 3 is a vertical sectional view taken on the line 3—3 of Fig. 2.

Fig. 5 is a horizontal sectional view taken on the line 5—5 of Fig. 3.

Fig. 6 is a horizontal sectional view taken on the line 6—6 of Fig. 3.

Fig. 7 is a vertical sectional view taken through the automatically controlled valve, illustrating a different adjusting mechanism from that shown in Fig. 3; and Fig. 8 is a broken horizontal sectional view taken on the line 8—8 of Fig. 7.

Figure 1:
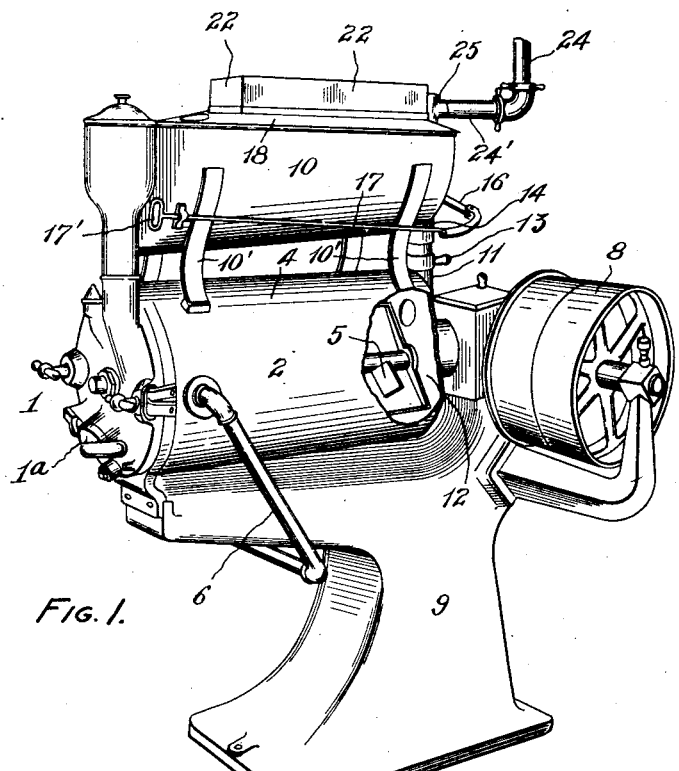
Fig. 1 is a perspective view of an ice cream making machine having a batch tank mounted above it and provided with valve and control mechanisms embodying my invention.
Figure 4:
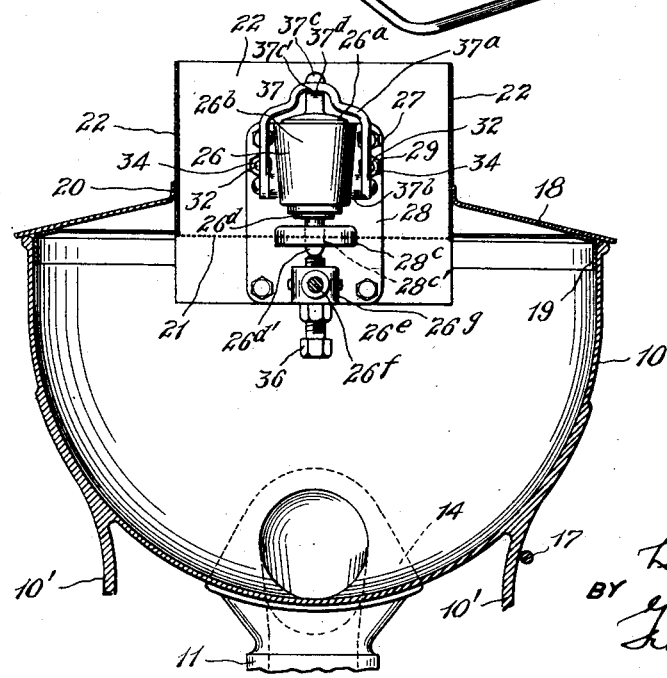
Fig. 4 is a transverse section taken on the line 4—4 of Fig. 3.
Figure 2:
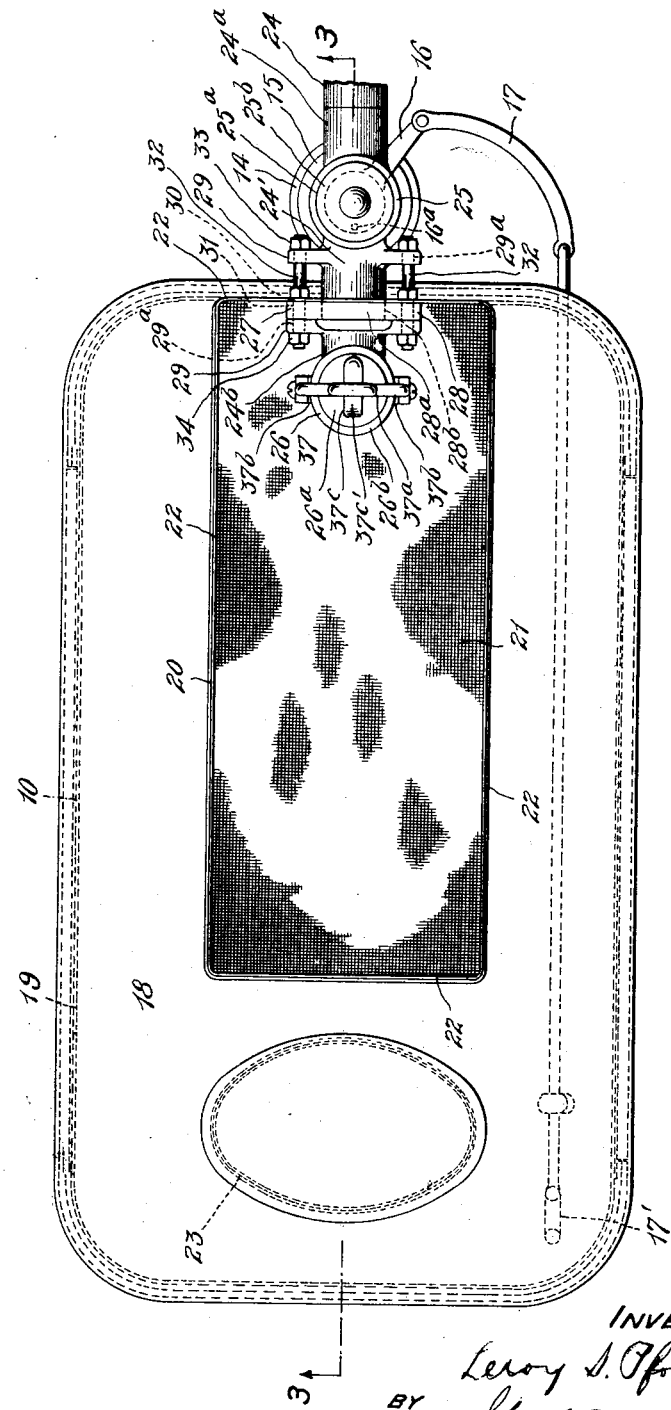
Fig. 2 is a top plan view of the machine shown in Fig. 1, the driving mechanism being omitted.

In the drawings, 1 indicates as an entirety a material treating apparatus, such as an ice cream making machine, which may be of any desired form of construction; that shown comprising a horizontal freezing cylinder 2, surrounded by a coil for the circulation of brine or other refrigerant, and a jacket 4 for well known purposes, and an agitating mechanism 5 of any preferred construction. At 1ª, the front head for the cylinder 2 is provided with a valved opening for the discharge of the material after it is frozen. 6 indicates one of the circulating pipes for the refrigerant. 8 indicates as an entirety the driving mechanism, connected in any desired manner to the elements or devices constituting the agitating mechanism. The cylinder 2 and driving mechanism 8 are mounted in any well known manner on a suitable support indicated as an entirety at 9.

10 indicates a batch tank preferably mounted or supported by means of suitable legs 10' on the jacket 4 of the freezing cylinder 2. 11 indicates a conduit leading from the batch tank 10 to the freezing cylinder 2 for conducting the material to be frozen to the latter. The conduit 11 preferably leads from the rear end of the batch tank 10 through the rear head 12 of the freezing cylinder 2. The conduit 11 may be made in two sections, one section being secured to and carried by the batch tank 10 and the other being integrally formed with the wall of the head 12. When the conduit 11 is constructed in this manner, the sections are detachably connected by a suitable coupling 13 in a liquid tight manner. 14 indicates a valve mechanism arranged in the conduit 11 and adapted to control the flow of the batch or mix or material from the tank 10 to the cylinder 2. The valve mechanism 14 is provided with a valve element 15 which preferably rotates approximately a quarter turn and back again to open and close the conduit 11 and thus permit or cut off the flow of the batch therethrough. The valve element 15 is preferably of conical shape to permit its ready removal for cleaning purposes. 16 indicates an arm fixedly connected to and extending from an up-standing boss or lug 15' on the valve element 15. At its free end, the arm 16 is connected to a link mechanism 17, which extends to the front end of the machine 1, where it is provided with a handle 17', whereby an operative may readily operate the valve element 15.

18 indicates a device adapted to be supported on the batch tank and serves as a cover therefor. The device 18 is provided around its edges with a depending flange 19 arranged to engage the inner walls of the batch tank 10 to maintain it in position. At 20, a section of the cover device is removed and provided with a strainer 21 through which the material flows into the batch tank. 22 indicates upstanding front, rear and side walls surrounding the strainer 21 to prevent the material discharged on the strainer from escaping. The strainer 21 and walls 22 may be secured together and to the cover device 18 in any well-known manner. At or near its front end the cover device may be formed with an inspection opening 23 and a hinged door for closing it.

24 indicates a pipe for supplying the material or the liquid portion of the material which is to be frozen in the freezing cylinder. The pipe 24 is connected with the source of supply, for example, a mixer (not shown) which is usually arranged on a level above the ice cream machine and the batch tank, whereby the material may flow by gravity through the supply pipe 24 to the batch tank 10. In all apparatus of which I am aware, the supply pipe has led vertically downward, but in order to correlate in a simple manner the supply pipe 24 with valve mechanisms 25 and 26, which I will later refer to, and which control the filling of the batch tank 10, I prefer to provide the supply pipe with a horizontal section 24'. Since the strainer 21 is carried by the cover device, I prefer to extend the supply pipe section 24' through an opening 22' formed in the rear wall 22, and to connect it thereto by means indicated as an entirety at 27. Of these connecting means, 28 indicates a supporting element having a body portion 28ª formed with an opening 28ᵇ, through which the pipe section 24' extends, and a pair of projecting members 28ᶜ, 28ᵈ, which will be later referred to. By preference, the supply pipe section 24' is formed of two members 24ª, 24ᵇ, correlated to telescope one within the other, each of which members is provided with oppositely extending lugs 29 formed with openings 29ª which align with similar openings in the lugs of the other pipe member and openings 30, 31, formed in the rear wall 22 and body portion 28ª. 32 indicates a pair of bolts which extend through these aligned openings 29ª, 30 and 31 and which through the co-action of nuts 33, 34, serve to connect the pipe members 24ª, 24ᵇ, supporting element 28 and rear wall 22 rigidly together.

The valve mechanism 25 is preferably mounted in axial alignment with the valve element 15 of the valve mechanism 14. The valve mechanism 25 preferably comprises a valve seat element 25ª formed in the walls of the section 24' and a valve element 25ᵇ rotatably mounted in the seat element 25ª. The valve element 25ᵇ is formed with a port 25ᶜ extending horizontally through it, whereby upon a quarter turn of the valve element 25ᵇ, the flow of material through the pipe 24' will be cut off. The walls of the valve seat element 25ª and valve element 25ᵇ are preferably conical shape to permit ready removal of the valve element 25ᵇ for cleaning purposes.

35 indicates as an entirety connections between the valve element 25ᵇ and the valve element 15 or the operating arm 16 therefor, whereby the valve element 25ᵇ may be operated simultaneously with the valve element 15, in either direction. The valve elements 25ᵇ and 15 are set, relative to each other, so that one is closed when the other is opened, and vice versa. The purpose of this is to shut off the supply of the material when the batch tank 10 is emptying and to cut off the discharge of the material from the batch tank 10 to the cylinder 2 when the former is filling. The connections 35 preferably comprise a straight rod in alignment with the axes of the rotary valves 15 and 25ᵇ fixed in any well-known manner to the valve element 25ᵇ, depending therefrom, and having bearings at its lower end in a socket 25ᶜ formed in the lug 15', and a crank arm 25ᵈ, the free depending end of which removably fits into an opening 16ª formed in the arm 16.

Of the valve mechanism 26, 26ª indicates a valve element removably mounted in the pipe section 24' at its discharge end within the side walls 22. The valve element 26ª is preferably of conical shape and fits within a conical wall 26ᵇ, whereby it can be readily removed for cleaning purposes. The conical wall 26ᵇ is preferably formed integrally with the walls of the pipe section 24'. The valve element 26ª and its supporting wall 26ᵇ are arranged so that the valve element is elevated when it is removed. The valve element 26ª is formed with a duct 26ᶜ leading horizontally inwardly from its side wall and then downwardly substantially axially of the valve element 26ª. The duct opening in the side wall of the valve element serves as an inlet port which registers with the pipe section 24'; the opening at the opposite other end of the duct serves as a seat 26ᶜ' for a valve element 26ᵈ, the stem 26ᵈ' of which slidably fits within an opening 28ᶜ', formed in the adjacent projecting member 28ᶜ.

26ᵉ indicates a device operatively connected to the valve element 26ᵈ and acted on or controlled by the rise and fall of the material in the batch tank 10 to slide upwardly and downwardly the valve element 26ᵈ to cause it to seat against the seat 26ᶜ' to cut off the supply of the material when a sufficient quantity has entered the batch tank 10 and unseat the valve element 26ᵈ therefrom when the batch tank 10 is emptied to allow a new supply of material to flow thereinto. The control device 26ᵉ preferably comprises a rod 26ᶠ provided at one end with a yoke 26ᵍ, which straddles and is pivoted to the other projecting member 28ᵈ, and carrying at its free or opposite end a hollow member or float, 26ʰ, which rides on the surface of the material as it flows into and out of the batch tank 10.

36 indicates an adjusting element, preferably a screw fitting a screw threaded opening formed in the shank of the yoke 26ᵍ, and engaging at its upper end the lower end of the valve stem 26ᵈ'. By adjusting the screw 36, it will be understood that the valve can be operated to permit a larger or smaller quantity of material to flow into the batch tank 10.

37 indicates means for locking the valve element 26ᵃ in operative position in the conical wall 26ᵇ. These locking means preferably comprise a link 37ᵃ (which may be of inverted U-shape) pivoted at its free ends upon bosses 37ᵇ provided on the opposite outer side walls of the wall 26ᵇ, and a hook member 37ᶜ formed integrally on top of the valve element 26ᵃ. The hook member is preferably formed with a slight hump, as shown at 37ᶜ' and a recess or depression 37ᵈ which forms a seat for the link 37ᵃ. The axes of the pivots and the bottom of the seat 37ᵈ for the link 37ᵃ are preferably in a vertical plane cutting the axis of the valve seat member 26ᵃ, so as to effectively hold the latter in position. In practice it is customary to mix the batch in a large tank on a floor above that on which the ice cream making machine or machines 1 are mounted; accordingly the column of material in the supply pipe 24 will cause a relatively high pressure on the valve seat element 26ᵃ. The lock means 37 is therefore advantageous in holding this element in position and against this pressure. By swinging the link 37ᵃ forwardly and causing it to ride the hump 37ᶜ', which it may do due to its slight resiliency, the valve element 26ᵃ can be lifted upwardly and removed.

The operation of the apparatus may be described as follows: Assuming that the freezing cylinder 2 and batch tank 10 are empty and that the supply pipe is filled with material which is to be frozen: under these circumstances the float 26ʰ and valve element 26ᵈ will be in the position shown in dotted lines in Fig. 3. If now the operative moves the operating mechanism, he will close the valve mechanism 14 and open the valve mechanism 25, thus permitting the material to flow through the pipe section 24' and duct 26ᶜ of the valve element 26ᵃ into the batch tank 10; as the material rises therein, it will cause the float 26ʰ to move upwardly and it in turn by reason of its engagement with the valve element 26ᵈ, will cause the latter to close the duct 26ᶜ, thus automatically cutting off the supply of material when the material rises in the batch tank 10 to a certain level. The operative then moves the operating mechanism 17 in the opposite direction, which operation opens the valve mechanism 14 and closes the valve mechanism 25, and permits the material in the batch tank 10 to flow through the conduit 11 into the freezing cylinder 2. As soon as the batch tank 10 is emptied, the operative may (and preferably does) immediately reverse the position of the valve elements 15 and 25ᵇ, so that the batch tank 10 may be again filled ready to deliver a batch of material into the cylinder 2 as soon as the previous batch has been frozen and discharged through the opening 1ᵃ.

It will be seen that upon the closing of the valve mechanism 14 and opening of the valve mechanism 25, which operations are performed simultaneously by the same mechanism, the material will flow into the batch tank 10 and when the latter is full, the valve mechanism 26 will automatically cut off the supply thereto, thus eliminating the necessity of the operative to watch the filling of the batch tank 10 and to cut off the supply thereto when it is filled. My invention is particularly advantageous where a large number of machines are being operated as it enables a single operative to run all of them continuously with successive batches in each in a rapid manner.

In Figs. 7 and 8 I have illustrated a slightly modified form of construction. In these views the pivoted rod 26ᶠ, which carries the float 26ʰ at its outer end, is provided at its inner end with a frame piece 39. At 40 the frame piece 39 is cut away to form an elongated slot or opening and the opposite side walls of the slot are formed with aligned openings 41. 42 indicates a bolt mounted at its opposite ends in the openings 41 and serving as a shaft for a rotary adjusting member 43. The adjusting member 43 comprises a body portion formed with an opening 43ᵃ to receive the shaft 42 and a plurality of radially extending arms 43ᵇ of different lengths and each adapted to be positioned for engagement with the valve stem 26ᵈ'. I prefer to provide the adjusting member 43 with four arms 43ᵇ. By rotating the member 43 to bring a longer or shorter arm 43ᵇ into position to engage the valve stem 26ᵈ' as the float rises a larger or smaller quantity of material, according to the arm that has been selected, will be allowed to flow into the batch tank before the valve element 26$^d$ seats against the seat 26$^{c'}$ and cuts off the supply of material. Any suitable means may be provided for clamping the adjusting member 43 in the position to which it may be adjusted. The means shown for illustrative purposes comprises screw threads on one end of the shaft 42, and a nut 44 and a head 45 on the opposite ends of the shaft. As will be understood from the drawings, when the nut 44 is tightened the head 45 of the shaft will be drawn against the adjusting member 43 and thus clamp it against the side wall adjacent to the nut 44.

To those skilled in the art of making machines of the class described, many alterations in construction and widely differing embodiments and applications of my invention will suggest themselves, without departing from the spirit and scope of the claims. My disclosures and the descriptions herein are purely illustrative and are not intended to be in any sense limiting, except as required by the scope of the appended claims.

It will be seen that the valve mechanism 26 is compound, comprising the plug 26$^a$ which may be manually operated to either completely cut off communication between the supply pipe and the receptacle 10, or to establish such communication, accordingly as the plug is turned; and also the automatically operated valve 26$^{c'}$, the operation of which has been already fully described.

What I claim is:

1. In apparatus of the class described, the combination with a freezing cylinder and a batch tank associated therewith, of a conduit leading from said batch tank to said cylinder, a cover device for said batch tank, a supply pipe connected to said cover device and arranged to discharge material into said tank, and a valve mechanism having a float element arranged to cut off the supply from said pipe when said tank is filled.

2. In apparatus of the class described, the combination with a freezing cylinder and a batch tank associated therewith, of a conduit leading from said batch tank to said cylinder, a cover device for said batch tank, a supply pipe connected to said cover device arranged to discharge material into said tank, and a valve mechanism, comprising a removable seat element, a removable valve element and a float element arranged to close said valve element when said tank is filled.

3. In apparatus of the class described, the combination with a freezing cylinder and a batch tank associated therewith, of a conduit leading from said batch tank to said cylinder, a cover element, a supporting device fixed to said cover device, a supply pipe mounted in said supporting element, a valve seat element mounted in said supply pipe, a valve element slidably mounted in said supporting element, and means acted on by rise of the material in said tank for closing said valve element against said valve seat element.

4. In apparatus of the class described, the combination with a freezing cylinder and a batch tank associated therewith, of a conduit leading from said batch tank to said cylinder, a cover device, a supporting element fixed to said cover device, a supply pipe mounted in said supporting element, a valve seat element mounted in said supply pipe, a valve element slidably mounted in said supporting element, and means pivoted to said supporting element and acted on by the rise of the material in said tank for closing the said valve element against said valve seat element.

5. In apparatus of the class described, the combination of a tank to be filled with material, a material supply pipe leading to said tank, a valve mechanism mounted in said pipe to permit or cut off the flow of the material to said tank, a rod pivotally mounted in said tank and carrying a float at its free end, and a member rotatably supported on said rod and provided with a plurality of arms each arranged to close said valve mechanism when the float rises to a predetermined height, whereby the filling of the tank can be varied.

6. In apparatus of the class described, the combination of a pair of receptacles, a pipe leading to one of said receptacles for supplying material thereto, a pipe for connecting said receptacles together, means for controlling the flow of material through said pipes, a valve mechanism for cutting off the discharge of material to the receptacle supplied by said supply pipe, a pivoted rod carrying a float for controlling said valve mechanism, and a device on said rod for closing said valve mechanism, said device being angularly adjustable whereby varying quantities of material can be supplied to said tank.

7. The combination of two receptacles, a conduit between them, a valve in said conduit, a supply conduit to one of the receptacles, a control valve in the supply conduit, connections between the said valves arranged to alternately open one and close the other as the valves are operated, and a third, compound, valve mechanism located between the said control valve in the supply conduit and the receptacle, and comprising a closing valve adapted to be manually operated, and an automatically operated valve to control the delivery of material to the receptacle according to the level of the material in the receptacle, when the said manually controlled valve is open.

8. In apparatus of the class described, the combination of a receptacle having a valved outlet in its lower portion, an inlet leading into its upper portion and formed with a valve seat, a rotatable plug having an inlet port in its side wall arranged to permit or cut off flow through said inlet and an outlet port, the latter port forming a valve seat, a rod pivotally mounted on the wall of said receptacle and carrying a float, a valve element for engaging and disengaging the last mentioned valve seat, and a plunger carried by said rod for operating said valve element, said plug being operable without affecting the relation of said valve element to its seat.

9. In apparatus of the class described, the combination of a receptacle having a valved outlet in its lower portion, an inlet leading into its upper portion and formed with a valve seat, a rotatable plug having an inlet port in its side wall arranged to permit or cut off flow through said inlet and an outlet port, the latter port forming a valve seat, a rod pivotally mounted on the wall of said receptacle and carrying a float, a valve element for engaging and disengaging the last mentioned valve seat, a plunger carried by said rod for operating said valve element, said plug being operable without affecting the relation of said valve element to its seat, and means for adjusting said plunger to control or regulate the filling of said receptacle to different levels.

In testimony whereof I have hereunto subscribed my name.

LEROY S. PFOUTS.